United States Patent [19]

Weiler et al.

[11] Patent Number: 4,722,425
[45] Date of Patent: Feb. 2, 1988

[54] SPOT-TYPE DISC BRAKE FOR AUTOMOTIVE VEHICLES

[75] Inventors: Rudolf Weiler, Frankfurt am Main; Karl Stoerzel, Dreieich, both of Fed. Rep. of Germany

[73] Assignee: Alfred Teves GmbH, Frankfurt am Main, Fed. Rep. of Germany

[21] Appl. No.: 839,785

[22] Filed: Mar. 14, 1986

[30] Foreign Application Priority Data

Mar. 15, 1985 [DE] Fed. Rep. of Germany ....... 3509277

[51] Int. Cl.⁴ .............................................. F16D 65/02
[52] U.S. Cl. ............................... 188/73.45; 188/73.34; 188/73.39
[58] Field of Search ............... 188/73.34, 73.39, 73.45, 188/73.35, 73.44, 205, 370

[56] References Cited

U.S. PATENT DOCUMENTS

| | | | |
|---|---|---|---|
| 4,121,698 | 10/1978 | Baum | 188/73.45 |
| 4,122,920 | 10/1978 | Harvey | 188/73.45 |
| 4,476,962 | 10/1984 | Bofill | 188/71.1 |

FOREIGN PATENT DOCUMENTS

| | | |
|---|---|---|
| 2636443 | 2/1977 | Fed. Rep. of Germany . |
| 2934608 | 3/1980 | Fed. Rep. of Germany . |
| 2414174 | 10/1983 | Fed. Rep. of Germany . |
| 3321805 | 12/1984 | Fed. Rep. of Germany . |
| 1175789 | 12/1969 | United Kingdom . |
| 1181086 | 2/1970 | United Kingdom . |
| 2016099 | 9/1979 | United Kingdom . |
| 2078883 | 1/1982 | United Kingdom ............. 188/73.45 |

*Primary Examiner*—Douglas C. Butler
*Attorney, Agent, or Firm*—James B. Raden; Robert P. Seitter

[57] ABSTRACT

A spot-type disc brake for automotive vehicles is disclosed including a brake carrier having a fixation section adapted to be affixed to the vehicle, a pair of circumferentially located carrier arms, a brake housing including axially disposed lateral guide attachments and a pair of guide pins extending from opposite sides of the fixation section of the carrier define two guide sections, one each received in openings in a respective one of the guide attachments. One guide pin section of each guide pin is axially offset within its respective guide opening.

2 Claims, 3 Drawing Figures

SPOT-TYPE DISC BRAKE FOR AUTOMOTIVE VEHICLES

BACKGROUND OF THE INVENTION

This invention is related to a spot-type disc brake, and in particular, a brake for automotive vehicles.

A disc brake of this type is known from the German printed and published patent application DE No. 33 21 805 A1. In this disc brake, two pins are fixed to a brake carrier on which pins a brake housing is supported, by way of rubber-like elastic bushings, in a way so as to be axially slidable and elastically damped. It is true that the major forces acting on the brake act in a circumferential direction relative to the brake disc and are transmitted to the brake carrier arms due to the brake linings taking support at the arms. Certain lifting forces also act at the brake housing which tend to twist the housing out of its normal at-rest position. As a result, it is necessary to provide a further guide on the side of the brake housing opposite the elastic rubber bushings. It is for this reason that heretofore an attachment extending in the circumferential direction has been provided on one side of the brake housing, which attachment is received below a recess provided in the related brake carrier arm. However, for functional reasons, the third guide has to be located preferably at the disc entry portion of the brake between the brake housing and the brake carrier. As a result, the brake housing becomes unsymmetrical and, therefore, does not allow the brake to be mounted alternately at different wheels of a vehicle, that is, the front left and front right brakes are not interchangeable.

SUMMARY OF THE INVENTION

It is, therefore, a principle object of the present invention to provide for a spot-type disc brake of the general kind indicated in which the main principles and advantages of the prior-art arrangement are maintained while providing for a symmetrical configuration that is uncomplicated and cost effective to manufacture and which also allows the brake to be swivelled about one guide of the brake carrier so as to simplify a changing of the brake linings when required.

According to an important aspect of the invention, these objects are achieved by providing extensions of the guide pins on either side of a fixation section of the brake carrier forming guide sections for the brake housing on either side of the carrier.

According to another feature of the invention, a symmetrical brake structure is provided in which the major forces acting in the circumferential direction during braking action will advantageously be transmitted to the brake carrier arms and the brake housing will remain virtually free of braking forces.

Another important aspect of the invention provides for significant reduction in manufacturing costs. In particular, expensive broaching and milling operations at the housing are eliminated which heretofore were required to shape the asymmetrical antilift guide and recess arrangement. A still further important aspect of the invention provides that in the event the brake linings require to be changed, the caliper can be swivelled about one of the guide pins which simplifies the change of the linings.

According to a preferred embodiment of the invention, the brake housing is formed with lateral attachments which are furnished with openings in the form of bores through which the guide pins extend. In this embodiment, the center lines of the pins and of the openings are arranged out of line with respect to each other. The misalignment offers the advantage that the opening or bore need not be machined to any high degree of precision during manufacture, and the risk of corrosion affecting brake operation is minimized largely due to the sufficient play. Proper guiding of the caliper is assured without the damping effect of the elastic elements being impaired.

According to another feature of the invention, the guide pins extend substantially up into the range of the external brake lining.

Still another feature provides for the brake carrier arms to be coupled to each other on the side facing away from the fixation section of the brake carrier, whereby the braking forces will be transmitted to both brake carrier arms.

BRIEF DESCRIPTION OF THE DRAWING

The invention will be better understood after reading the following Detailed Description Of The Preferred Embodiment in conjunction with the drawings in which.

DETAILED DESCRIPTION OF THE PREFERRED EMBODIMENT

Figure 1:
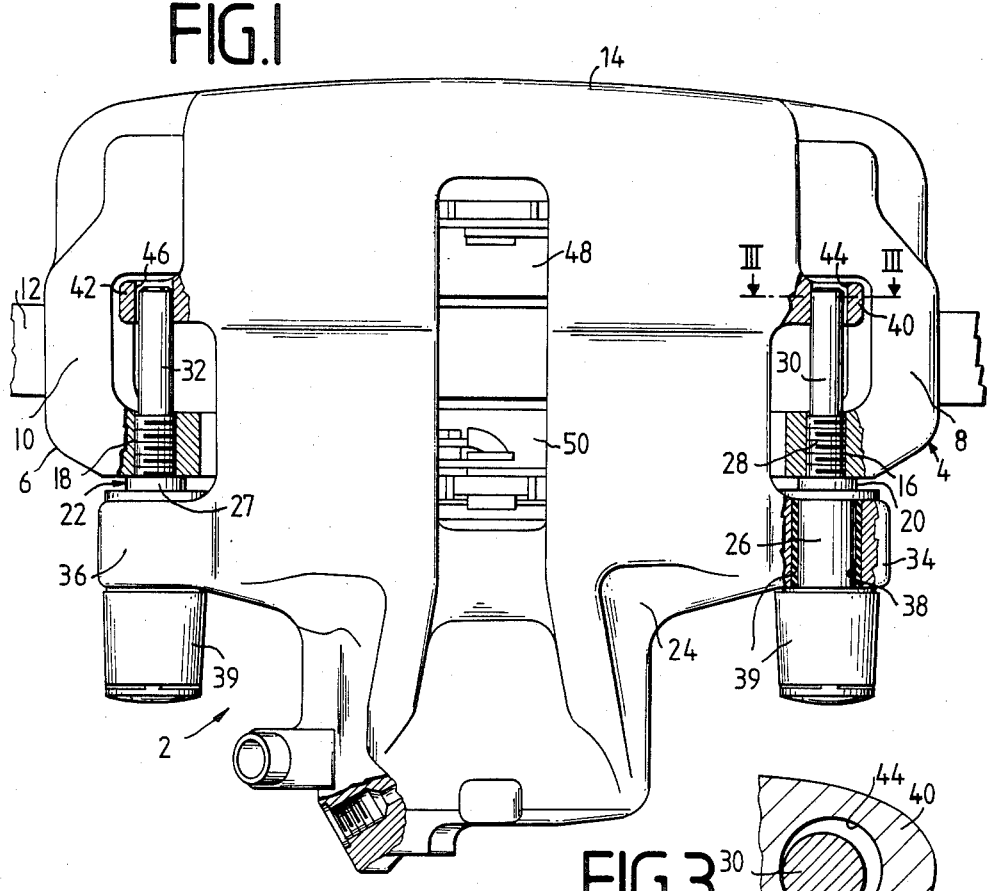
FIG. 1 is a top plan view, partly in cross-section, of a spot-type disc brake showing details of construction.

A spot-type disc brake 2 is shown in the drawing comprising a brake carrier 4 which includes a fixation section 6 for fixation to a vehicle, and two paraxially extending brake carrier arms 8, 10 which project beyond the edge of the brake disc 12 and whose ends are coupled to each other by means of a coupling section 14. The fixation section 6 of the brake carrier 4 extends substantialy parallel to the brake disc 12. The brake carrier arms 8, 10 constitute those parts of the brake carrier 4 which are located farthest to the outside in the circumferential direction. The brake linings 48, 50 are guided and supported at the brake carrier arms 8, 10 and at the fixation section 6 which is furnished with an appropriate guide for that purpose.

In the fixation section 6 of the brake carrier 4 and in close proximity to the brake carrier arms 8, 10, tapped holes 16, 18 are provided into which pins 20, 22 are screwed and which support and axially guide the brake housing 24 which comprises an actuating device (not shown in the drawing), such as a brake piston. The pins 20, 22 have a stepped configuration and form a first guide section 26 which extends away from the brake disc, a threaded section 28, and a second guide section 30 which extends across the brake disc. The diameter of the second guide section corresponds roughly to the diameter of the core portion of the threaded section 28. The guide sections 30, 32 of the pins 20, 22 extend in paraxial direction relative to and are positioned closely beside the brake carrier arms 8, 10. First attachments 34, 36 extending in the circumferential direction are provided at the brake housing 24, which are furnished with bores 38 through which the first guide sections 26, 28 pass. Between the bore 38 and the guide sections 26, 28, annular bushing-shaped or hat-shaped elastic elements 39, such as rubber bushings, are inserted which provided for elastic shifting of the brake housing transversely of the longitudinal axis under braking.

Figure 3:
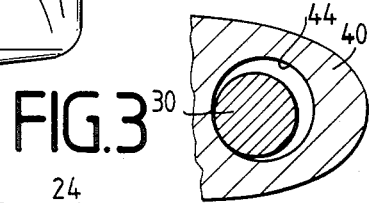
FIG. 3 is an enlarged cross-section taken along the line III—III in FIG. 1 showing the details of construction.
Figure 2:
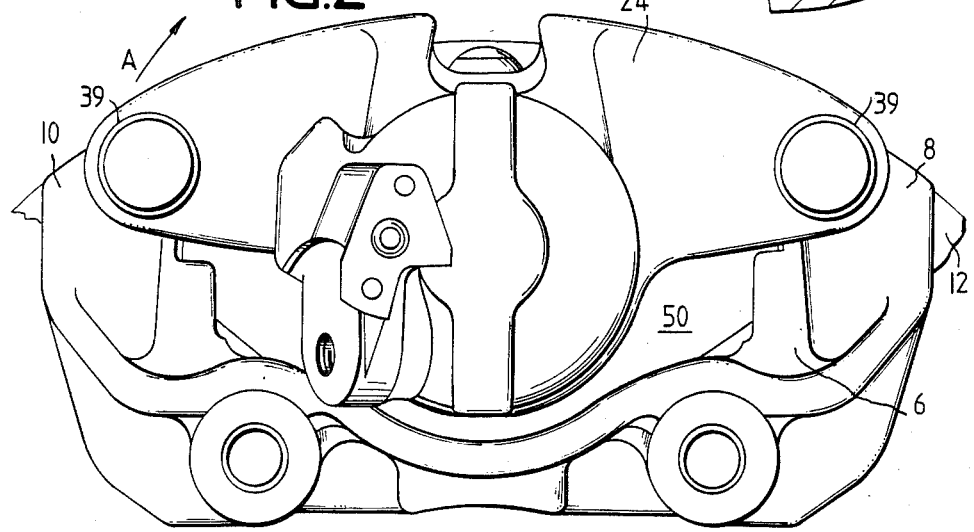
FIG. 2 is a view from the inside of the spot-type disc brake illustrated in FIG. 1.

Second attachments 40, 42 are provided at the brake housing 24 at an axial distance from the first attachments 34, 36. These second attachments 40, 42, are also provided with bores 44, 46 in which the second guide sections 30, 32 of the pins 20, 22 extend. The center lines of the guide sections 30, 32 are positioned out of alignment with respect to the center lines of the respective bores 44, 46 as illustrated in FIG. 3. The second attachments 40, 42 are arranged between the fixation section 6 and the coupling section 14 of the brake carrier 4, and in the initial condition, that is when the brake linings are new, they are disposed in close proximity to the coupling section 14. As is outlined by an arrow A in FIG. 2, the brake housing can be swivelled in an outward direction about the pin 22 upon removal of the other pin 20 so that the brake linings can be withdrawn and inserted with ease.

What is claimed is:

1. A spot-type disc brake for an automotive vehicle comprising a brake carrier adapted to be stationarily affixed to the vehicle, said carrier including a fixation section positioned on one side of a brake disc, a pair of carrier arms extending from said fixation section disposed in spaced-apart relationship from each other in a circumferential direction relative to said disc, said carrier arms projecting beyond the edge of said brake disc, a brake housing axially slidably mounted to said brake carrier by two pins, each rigidly and immovably affixed to said brake carrier and extending through openings provided in lateral attachments on said brake housing disposed on opposite sides of said fixation section, elastic elements disposed between said pins and said brake housing, two brake linings one located on each opposite side of said brake disc, said linings supported at said brake carrier arms, and each of said two pins includes first and second portions extending from opposite sides of said fixation section of said brake carrier defining first and second guide sections for said brake housing wherein said second guide section of each of said pins is received in a respective one of said openings in axially offset relationship therewith, and said pins extend substantially up into the range of an external one of two brake linings.

2. A spot-type disc brake as claimed in claim 1, wherein said pins are disposed in close proximity to said brake carrier arms.

* * * * *